UNITED STATES PATENT OFFICE.

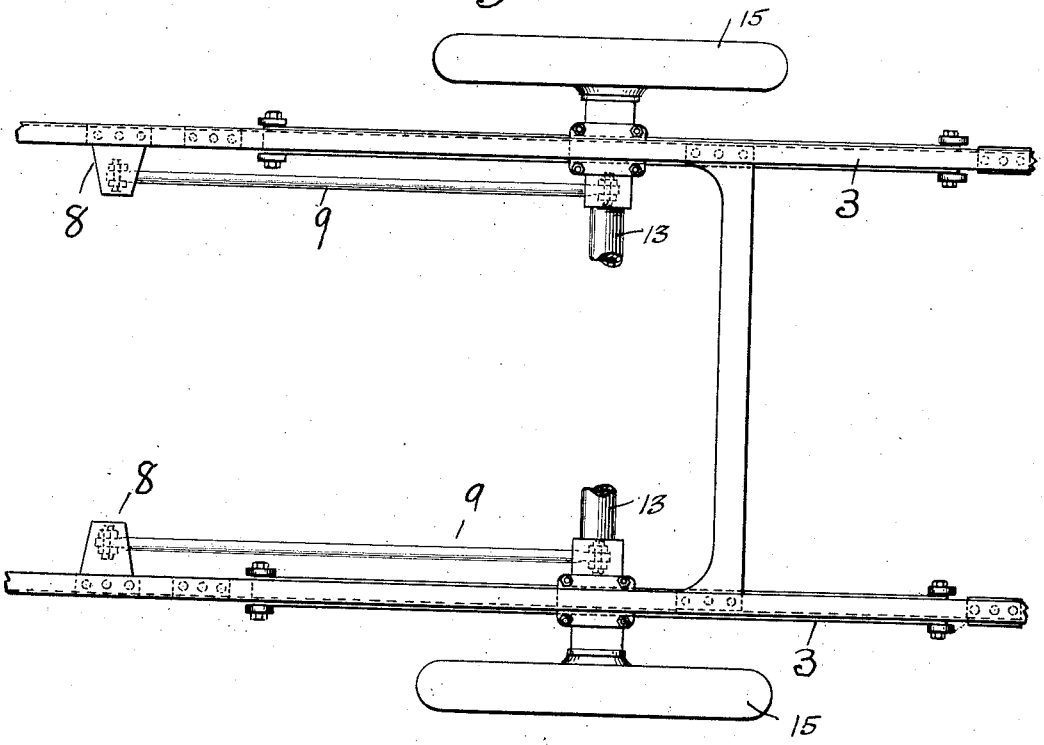
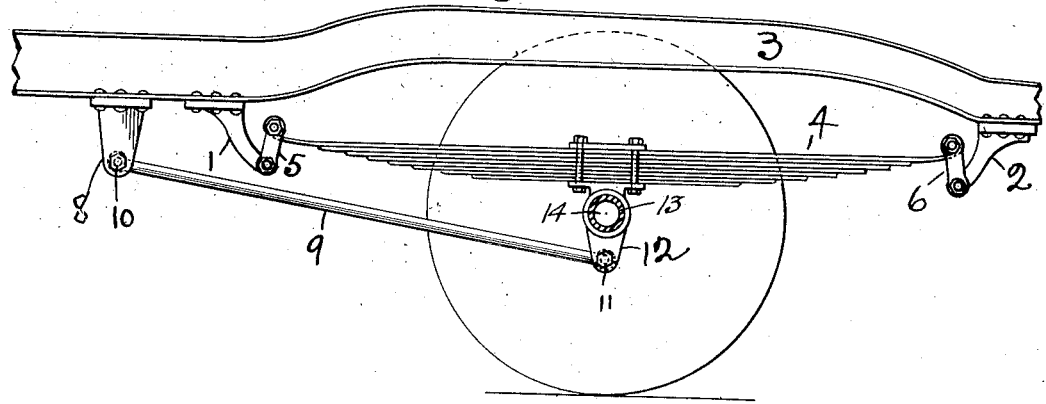

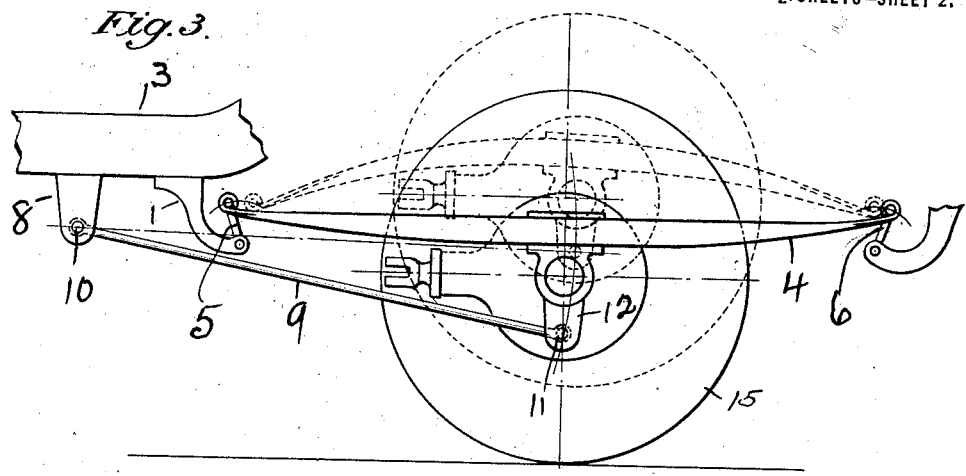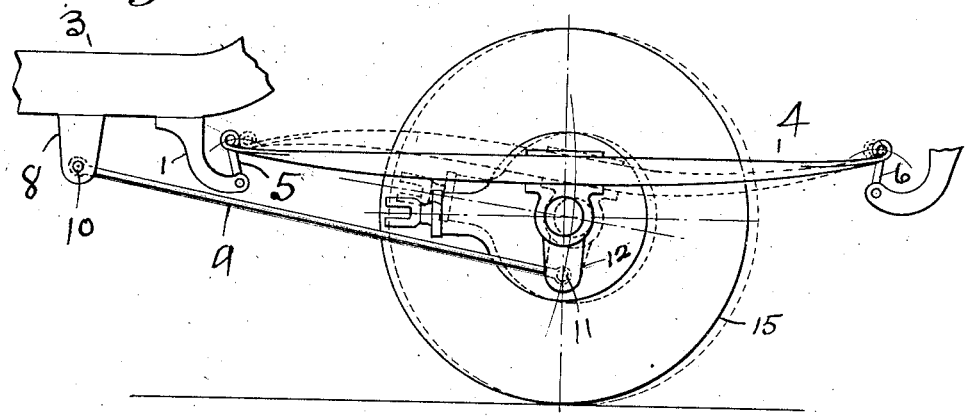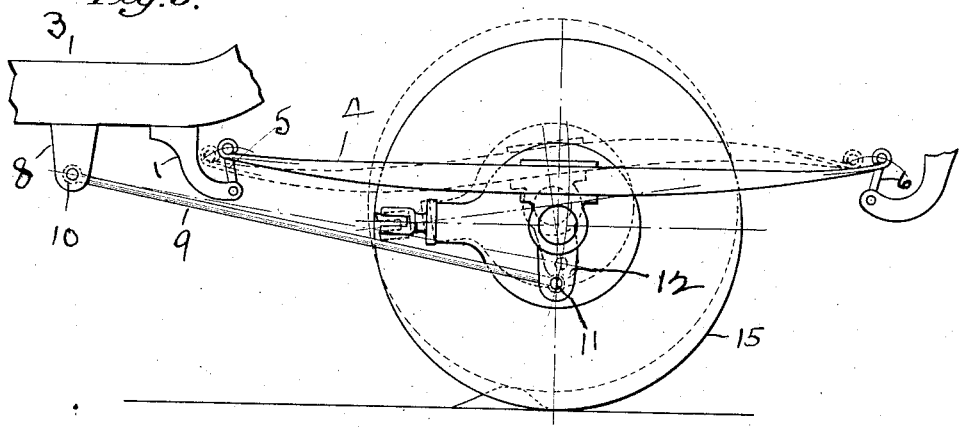

HENRY M. CRANE, OF NEW YORK, N. Y.

VEHICLE SPRING SUSPENSION.

1,406,935. Specification of Letters Patent. Patented Feb. 14, 1922.

Application filed December 11, 1919. Serial No. 344,025.

*To all whom it may concern:*

Be it known that I, HENRY M. CRANE, a citizen of the United States, residing at New York city, in the county of New York and State of New York, have invented certain new and useful Improvements in Vehicle Spring Suspensions, of which the following is a specification.

My invention relates to vehicle spring suspension and more particularly to a spring suspension for use on the drive axle of a self propelled vehicle.

The object of my invention is to provide a spring suspension of such construction that the load springs themselves will not only absorb the vertical but also the horizontal shocks which are imparted to the axle by the wheels in passing over obstructions or dropping into depressions in the road surface as well as shocks from the sudden application of power or brakes.

The other objects and novel features of my invention will be more fully described and pointed out in the following specification and claims.

In the accompanying drawings Fig. 1 is a top plan view of my invention. Fig 2 is a side elevation showing the parts in the position which they assume when the vehicle is at rest. Fig. 3 is a side elevation showing in dotted lines the position which the parts assume when the axle structure is moved toward the frame. Fig. 4 is a side elevation showing in dotted lines the position which the parts assume when the engine torque is applied. Fig. 5 is an elevation showing in dotted lines the position which the parts assume when the wheel rides over an obstruction.

Similar numerals refer to similar parts throughout the accompanying drawings.

Referring to the structure disclosed in Figs. 1 and 2: Brackets 1 and 2 are secured to the frame 3. The load springs 4 are connected to these brackets by the links 5 and 6 and at or near their centres are connected against rotation to the load carrying member 13 of the axle structure. Depending from the frame are brackets 8, to which the forward ends of the radius rods 9 are secured by the pivots 10. The other ends of the radius rods 9 are secured by the pivots 11 to the brackets or levers 12, which depend from and ar secured to the load carrying member of the axle structure, the pivots 11 being positioned vertically off centre and preferably below the longitudinal axis of the axle structure. The axle structure comprises the load carrying member 13 and driving member 14, to which are secured the road wheels 15.

In Figs. 3, 4 and 5 the brackets 2 are dispensed with and the rear ends of the side members of the frame are curved and one end of the links 6 is pivoted thereto.

This construction permits the axle structure or either end thereof to be moved toward or away from the frame, against the resistance of the load springs without substantially swinging it from its right-angular alignment thereby compelling the load springs to absorb the vertical shocks which are communicated to the road wheels when passing over an uneven road surface. It also permits a rotation of the axle structure against the resistance of the load springs, about the pivoted ends of the radius rods 9, to absorb horizontal road shocks and torsion strains due to the application of power or the application of the brakes, thereby relieving the driving mechanism, clutch and tires from such shocks and strains to which they would otherwise be subjected and which they would otherwise communicate to the frame.

In practice I have found that a vehicle equipped with my improved spring suspension can be easily and accurately guided over an uneven road surface and that vertical and horizontal road shocks and torsion strains communicated to the axle structure are almost entirely absorbed by the load springs without being imparted to the frame.

I claim:

1. The combination comprising a vehicle frame, a drive axle consisting of a load carrying member, driving means, road wheels, load springs secured against rotation to said load carrying member, links connecting the ends of said load springs to the frame, and radius rods pivoted at one end at a point which is fixed with reference to said frame and at the other end to said load carrying member at a point substantially vertically distant from the radial axis of the axle structure.

2. The combination comprising a vehicle frame, a drive axle consisting of a load carrying member, driving means, road wheels, load springs, means for connecting the load springs to the load bearing member of the driving axle against rotation, means connecting the ends of the load springs to the frame which permit longitudinal movement of the springs with reference to the frame and radius rods pivoted at one end at a point which is fixed with reference to the frame and at the other end to said load carrying member at a point substantially distant vertically from the radial axis of the structure.

Signed at New Brunswick, in the county of Middlesex and State of New Jersey, this first day of December, 1919.

HENRY M. CRANE.

Witnesses:
ANDREW WILLGOOS,
RICHARD R. ZIMMER.